(12) United States Patent
Jessiman et al.

(10) Patent No.: US 11,155,052 B2
(45) Date of Patent: Oct. 26, 2021

(54) THREE DIMENSIONAL FOOTWEAR COMPONENT AND METHOD OF MANUFACTURE

(71) Applicant: Wolverine Outdoors, Inc., Rockford, MI (US)

(72) Inventors: Alexander W. Jessiman, Newton, MA (US); Andrea A. Paulson, Arlington, MA (US); Christopher J. Mahoney, Concord, MA (US); J. Spencer White, North Easton, MA (US)

(73) Assignee: Wolverine Outdoors, Inc., Rockford, MI (US)

( * ) Notice: Subject to any disclaimer, the term of this patent is extended or adjusted under 35 U.S.C. 154(b) by 39 days.

(21) Appl. No.: 16/523,094

(22) Filed: Jul. 26, 2019

(65) Prior Publication Data

US 2020/0086597 A1   Mar. 19, 2020

Related U.S. Application Data

(60) Provisional application No. 62/731,140, filed on Sep. 14, 2018.

(51) Int. Cl.
*B29C 64/112*   (2017.01)
*B29D 35/14*   (2010.01)
*B29K 75/00*   (2006.01)
*B33Y 80/00*   (2015.01)
*B29K 105/04*   (2006.01)
*B29K 23/00*   (2006.01)
*B33Y 10/00*   (2015.01)

(52) U.S. Cl.
CPC .......... *B29D 35/142* (2013.01); *B29C 64/112* (2017.08); *A43D 2200/60* (2013.01); *B29K 2023/083* (2013.01); *B29K 2075/00* (2013.01); *B29K 2105/048* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| 9,039,953 | B2 | 5/2015 | Kraibuehler et al. |
| 10,040,249 | B2 | 8/2018 | Kraibuehler et al. |
| 2002/0111707 | A1 | 8/2002 | Li et al. |

(Continued)

FOREIGN PATENT DOCUMENTS

| DE | 102009030099 A1 | 12/2010 |
| EP | 1886793 A1 | 2/2008 |

(Continued)

*Primary Examiner* — Monica A Huson
*Assistant Examiner* — Kelsey C Grace
(74) *Attorney, Agent, or Firm* — Warner Norcross + Judd LLP

(57) ABSTRACT

A 3D foam component for an article of footwear and a method for manufacturing a 3D foam component for an article of footwear is provided. The method includes a sequential deposition of liquid droplets of liquid polymer material onto an object carrier. A blowing agent is introduced to the molten polymer prior to or sequentially with or after the discharge of a liquid droplet. The resulting component includes a plurality of foam pellets formed by the expansion and cooling of droplets of liquid polymer material injected with the blowing agent.

10 Claims, 10 Drawing Sheets

(56) References Cited

U.S. PATENT DOCUMENTS

| | | | | |
|---|---|---|---|---|
| 2002/0147245 | A1* | 10/2002 | Kim | B29C 44/60 |
| | | | | 521/50 |
| 2005/0027025 | A1* | 2/2005 | Erb | A43B 7/28 |
| | | | | 521/50 |
| 2014/0197576 | A1 | 7/2014 | Kraibuhler et al. | |
| 2017/0341294 | A1* | 11/2017 | Miller | B29C 64/112 |

FOREIGN PATENT DOCUMENTS

| | | | |
|---|---|---|---|
| EP | 2720853 | A1 | 4/2014 |
| EP | 2865289 | A1 | 10/2014 |

\* cited by examiner

THREE DIMENSIONAL FOOTWEAR COMPONENT AND METHOD OF MANUFACTURE

BACKGROUND

The present invention relates to footwear constructions, and more particularly to components and related methods of making footwear using additive manufacturing techniques.

Conventional footwear include an upper and a sole secured to an upper. The upper provides a void that receives a wearer's foot and positions the foot with respect to the sole. The sole commonly includes a midsole and an outsole, these components can provide cushion and traction for the foot during a variety of activities, such as walking, running or standing. A footbed or insole typically is disposed in the interior of the upper for additional cushion. Most components of a sole, for example, midsoles and outsoles, as well as insoles, are formed by traditional manufacturing processes, such as injection molding and pour molding.

The midsole, outsole and insole frequently are designed to best address competing characteristics, for example, fit, stability, weight, protection and cushion. Due to the limitations of traditional manufacturing methods, many times one characteristic is sacrificed for another, leaving the footwear less than ideal. For example, where weight to the wearer is paramount, a sole might be molded using a single low-density material to provide light-weight footwear. In turn, this can sacrifice shock attenuation, or can make the sole prone to premature wear.

In some cases, sole components can be constructed to include materials with different densities; however, this typically requires special molds that allow certain materials in one location of the sole component but not others. These molds can be rather complex and expensive to make due to all the multiple ports and gates used to inject the material in a specific location of the mold and keep that material in a particular region or zone of the mold to form the sole. Of course, footwear typically are manufactured in multiple sizes, so multiple expensive molds are needed to manufacture such multi-density soles in the various sizes.

In addition, due to conventional molding techniques, sole components usually are rather homogenous in cross section from top to bottom of a given molded component. This is due to the way that injection and pour molding works, so there is little opportunity to vary materials vertically, even when using complicated molds to form the sole components.

Although conventional footwear forming techniques can yield sole components that attempt to balance multiple competing characteristics, there remains a long felt and unmet need for processes and related footwear components having discretely adjustable parameters and properties to enhance fit, stability, weight, protection and cushioning.

SUMMARY OF THE INVENTION

A method of manufacturing a three dimensional polymer footwear component utilizing additive manufacturing techniques is provided to yield selected mechanical and/or aesthetic properties for such footwear component. A related system and equipment for performing the method also is provided.

In one embodiment, the method can include a sequential deposition of liquid droplets of molten or liquid polymer material onto an object carrier to form a 3D polymer footwear component.

In another embodiment, the method can include injecting a blowing agent into the molten polymer prior to or sequentially with the discharge of a liquid droplet to form a 3D polymer foam footwear component. The blowing agent can be a chemical or physical blowing agent that expands the liquid droplet extruded onto the object carrier. The droplet can cool and solidify to form a foam pellet.

In still another embodiment, the method can include manufacturing a footwear component, such as a sole, midsole, outsole, and/or insole, by a sequential extrusion of liquid droplets of liquid polymer material onto an object carrier for the component to be produced. A blowing agent is injected into the molten polymer prior to or sequentially with the discharge of a liquid droplet. The blowing agent can be a chemical or physical blowing agent that expands the liquid droplet extruded onto the object carrier. The droplets expand and cool to form foam pellets.

In yet another embodiment, a footwear construction can include an upper, a sole joined with the upper and comprising a midsole and an outsole, and an insole or footbed disposed in an interior of the upper, wherein at least one of the midsole, outsole, insole and footbed comprises a plurality of foam pellets or cells formed by the expansion and cooling of droplets of liquid polymer material injected with a blowing agent.

In even another embodiment, a footwear construction is provided with at least one component comprising a plurality of foam pellets formed by the expansion and cooling of droplets of liquid polymer material injected with a blowing agent.

In a further embodiment a footwear construction is provided including a sole with mechanical properties, such as density, compression, yield and elasticity, which can be selectively variable in three dimensions.

In still a further embodiment, a footwear construction is provided including a sole with aesthetic properties, such as color, texture, cell shape and size, that can be selectively variable throughout the sole, from one region to the next.

In yet a further embodiment, a system can be provided to introduce the blowing agent to the molten polymer, or associate the blowing agent with a liquid droplet to form a 3D polymer foam footwear component. The system can include a nozzle that introduces the blowing agent to the molten polymer stream upstream of the location where the droplet is formed, and/or that introduces the blowing agent into or on the droplet before, during or after the droplet's formation and/or deposition on a substrate.

In even a further embodiment, the system can introduce more or less of the blowing agent into the molten polymer or liquid droplet so as to provide preselected mechanical properties to a cell produced by the cured liquid droplet.

In another, further embodiment, a footwear generation system can be configured to generate an article of footwear with at least one component comprising a plurality of foam pellets formed by the expansion and cooling of droplets of liquid polymer material injected with a blowing agent. The system can leverage additive manufacturing to produce a footwear component, such as a sole, midsole, outsole, and/or insole, with a complex combination of geometry, material properties and/or aesthetics such as color and texture.

These and other objects, advantages and features of the invention will be more readily understood and appreciated by reference to the detailed description of the preferred embodiments and the drawings.

Before the embodiments of the invention are explained in detail, it is to be understood that the invention is not limited to the details of operation or to the details of construction and the arrangement of the components set forth in the following description or illustrated in the drawings. The invention can be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration can be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
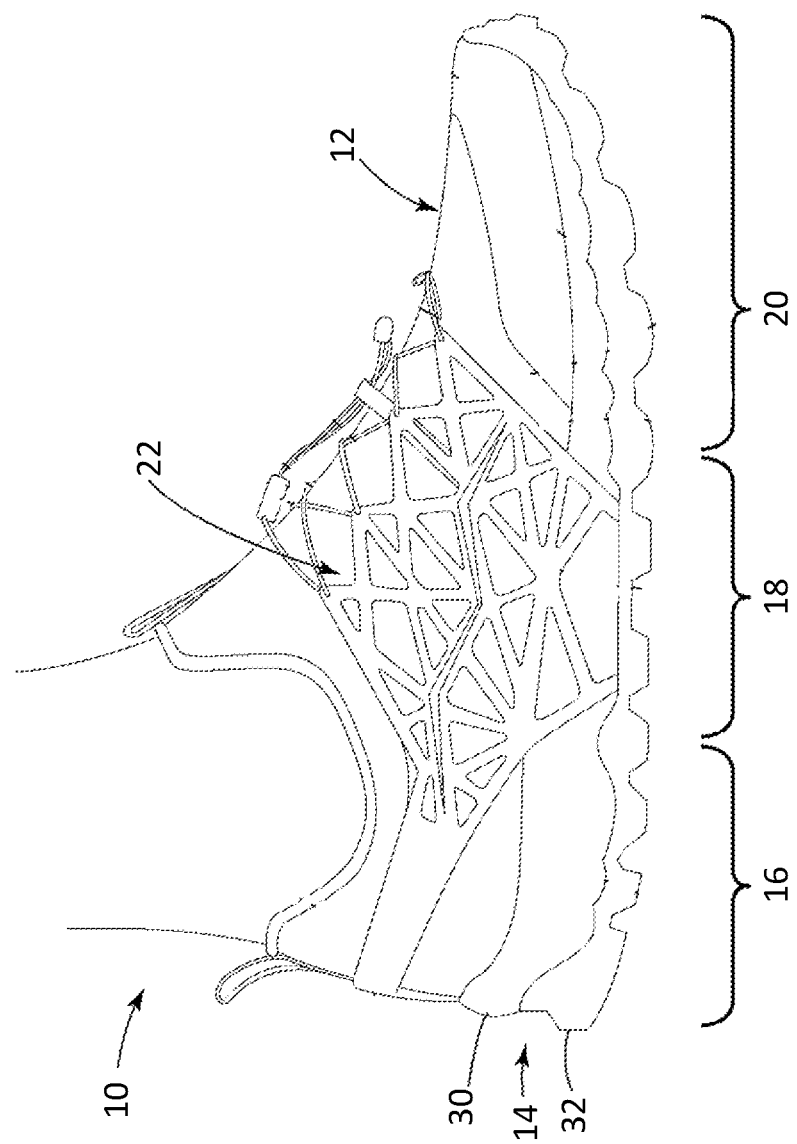
FIG. 1 is a side view of footwear including a sole in accordance with a current embodiment.

An article of footwear constructed in accordance with a current embodiment is shown in FIG. 1, and generally designated 10. Generally, the footwear 10 includes an upper 12 and a sole 14 joined with the upper 12. The sole 14 can include one or more sections of a free-formed polymer foam formed by additive manufacturing. For example, the sole 14 can include a heel section 16, an arch or midfoot section 18 and a forefoot section 20. Any one of, or combination of, these sections can have at least a portion formed of a plurality of foam pellets formed by the expansion and cooling of droplets of liquid polymer material injected with a blowing agent. The footwear can further include a support cage 22 at least partially free floated over the upper 12.

Figure 2:
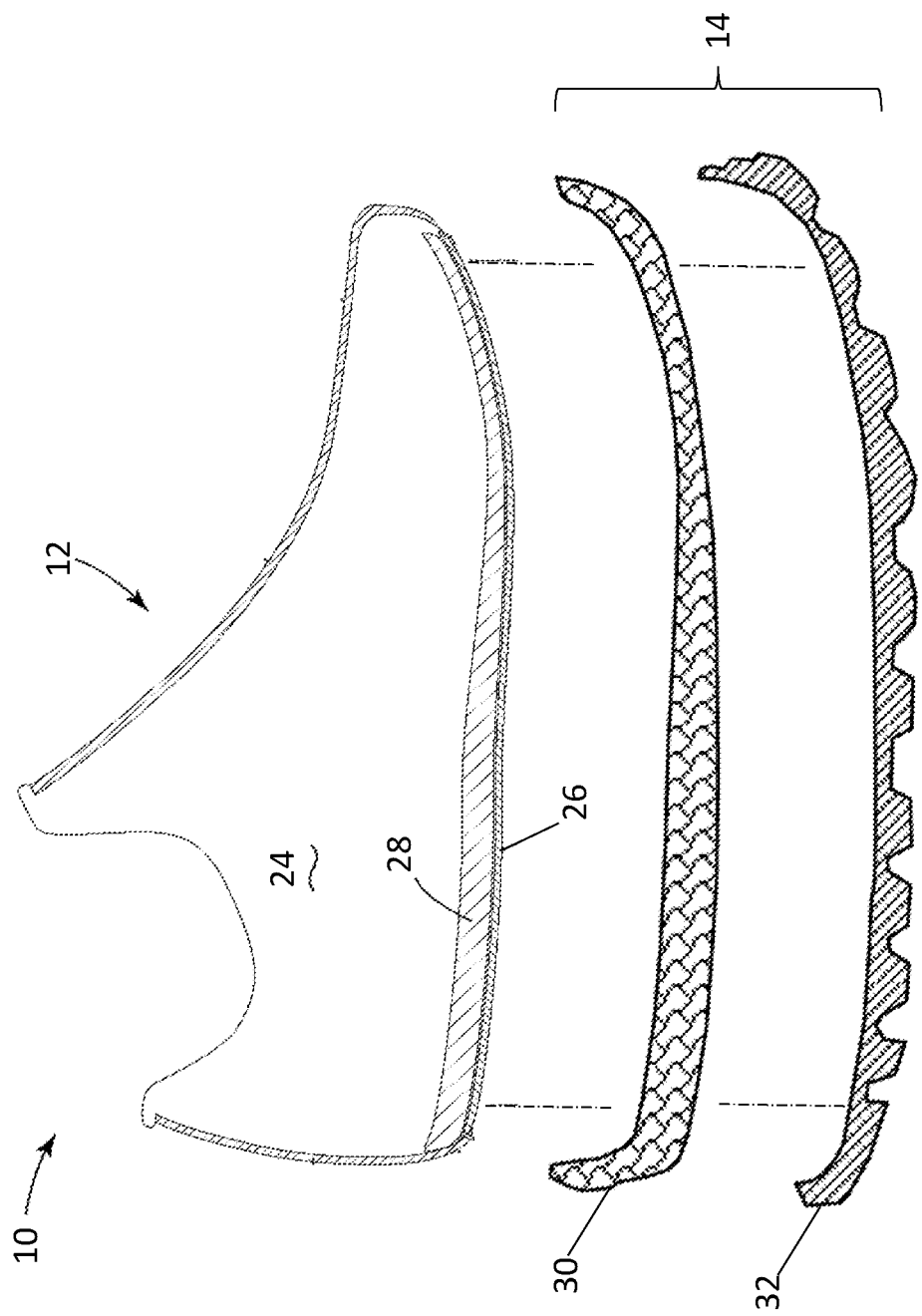
FIG. 2 is an exploded section view of the footwear from FIG. 1.

Referring additionally to FIG. 2, the upper 12 will only be described briefly here. The upper 12 optionally is of a Strobel construction in which a foot receiving upper interior 24 is closed on its bottom or lowermost portion by a Strobel board 26 or other similar component. The footwear 10 can include a footbed and/or insole 28 disposed in the interior 24 of the upper 12, and which can be disposed above the Strobel board 26 where included. In some embodiments, the footbed and/or insole 28 can be constructed from ethyl vinyl acetate (EVA) foam or polyurethane foam.

Optionally, although not shown, the footwear 10 can be constructed to include a knitted upper, constructed for example by weaving or knitting techniques, such as circular knitting, flat knitting, Jacquard knitting or other types of knitting. Of course, the footwear 10 can be provided with any other type or style of upper construction capable of being suitably joined with the sole 14. The joining of the sole 14 and the upper 12 can be accomplished using adhesives, cement, injection molding, pour molding or any other technique used to join an upper and sole.

The sole 14 further can include a midsole 30 and an outsole 32. The midsole 30 is positioned between the upper 12 and the outsole 32, and is used to provide cushioning, fit, comfort and support. The outsole 32 defines the bottom of the footwear 10 and provides grip and traction. As illustrated, the Strobel board 26 can rest or be placed immediately adjacent an upper surface of the midsole 30 if optionally included in the construction.

The midsole 30 can be constructed from a material having a first density that can be generally less dense than the density of the material from which the outsole 32 is constructed. The first density of the midsole 30 can be such that it compresses relatively easily to provide cushion to the wearer's foot. The midsole 30 can be constructed from ethyl vinyl acetate (EVA), polyurethane, latex, foam, a gel or other materials, including, but not limited to, EVA foam or polyurethane foam, or any of the other materials as described below and suitable for additive manufacturing processes.

The outsole 32 can be disposed below the midsole 30 and the upper 12. The outsole can be adhered, cemented and/or molded directly to a lower surface of the midsole 30 in the regions where these elements contact one another so as to form the sole 14.

The outsole 32 can be constructed from one or more materials, such as rubber, and can include lugs, tread, or other gripping elements on the lower surface thereof. Alternatively, the outsole 32 can be constructed from polyurethane or ethyl vinyl acetate (EVA), including, but not limited to, polyurethane foam or EVA foam. Of course, the outsole 32 can be constructed from any relatively wear resistant polymer, elastomer and/or natural or synthetic rubber or other materials capable of providing the desired functional characteristics. The outsole can include certain localized outsole parts, such as a toe spring and/or heel plate as described in further detail below, and built upon utilizing the additive manufacturing methods as described herein.

Although the current embodiment of footwear 10 is illustrated in the context of a performance shoe, it can be incorporated into any type or style of footwear, including casual shoes, trail shoes and boots, hiking boots, work boots, all-terrain shoes, barefoot running shoes, athletic shoes, running shoes, sneakers, conventional tennis shoes, walking shoes, multisport footwear, boots, dress shoes or any other type of footwear or footwear components. It also should be noted that directional terms, such as "vertical," "horizontal," "top," "bottom," "upper," "lower," "inner," "inwardly," "outer", "outwardly," "below" and "above" are used to assist in describing the embodiments based on the orientation of the embodiments shown in the illustrations.

Further, the terms "medial," "lateral" and "longitudinal" are used in the manner commonly used in connection with footwear. For example, when used in referring to a side of the shoe, the term "medial" refers to the inward side (that is, the side facing the other shoe) and "lateral" refers to the outward side. When used in referring to a direction, the term "longitudinal direction" refers to a direction generally extending along the length of the shoe between toe and heel, and the term "lateral direction" refers to a direction generally extending across the width of the shoe between the medial and lateral sides of the shoe. The use of directional terms should not be interpreted to limit the invention to any specific orientation.

Additionally, as used herein, the term "arch section" (or midfoot section or arch) refers generally to the portion of the footwear or sole corresponding to the arch or midfoot of the wearer's foot; the term "forefoot section" (or forefoot) refers generally to the portion of the footwear forward of the arch section corresponding to the forefoot (for example, including the ball and the toes) of a wearer's foot; and the term "heel section" (or heel) refers generally to that portion of the footwear rearward of the arch section corresponding to the heel of the wearer's foot. The heel section 16, arch section 18, and forefoot section 20 generally are identified in FIG. 1. However, it is to be understood that delineation of these regions can vary depending upon the configuration of the sole and/or footwear.

At least one of the midsole 30, outsole 32, and/or the insole 28 can include one or more portions of a free-formed polymer foam formed by additive manufacturing. The midsole 30, outsole 32, and/or the insole 28 can more specifically be manufactured by a sequential extrusion of liquid droplets of molten polymer onto an object carrier. A blowing agent is injected into the molten polymer prior to or sequentially with the discharge of a liquid droplet, and facilies the formation of foam having a lower density than that of the original polymer material. The resulting midsole 30, outsole 32, and/or the insole 28 comprises a plurality of foam pellets formed by the expansion and cooling of droplets of liquid polymer material injected with blowing agent. In some embodiments, the resulting midsole 30, outsole 32, and/or the insole 28 can consist entirely of such foam pellets.

The polymer material can be any foamable polymer material suitable for footwear, including, but not limited to, ethylene vinyl acetate (EVA) and polyurethane (PU). Other materials can be used, provided the material is extrudable in liquid form and includes properties suitable for footwear sole applications.

The blowing agent can be any material that facilities the formation of foam. For example, the blowing agent can be a chemical blowing agent, i.e. a gas generated by a chemical reaction, or a physical blowing agent, i.e. a gas at the temperature that the foam is formed. Some non-limiting examples of suitable chemical blowing agents for use with at least some of the embodiments disclosed herein are isocyanate and water for polyurethane, azodicarbonamide for vinyl, hydrazine and other nitrogen-based materials for thermoplastic and elastomeric foams, and sodium bicarbonate for thermoplastic foams. Some non-limiting examples of suitable physical blowing agents for use with at least some of the embodiments disclosed herein are hydrofluorocarbons (HCFCs), hydrocarbons (e.g. pentane, isopentane, cyclopentane), nitrogen and liquid carbon dioxide ($CO_2$).

Optionally, a mixed physical/chemical blowing agent, such as when used to produce flexible polyurethane (PU) foams, is also contemplated.

Figure 3:
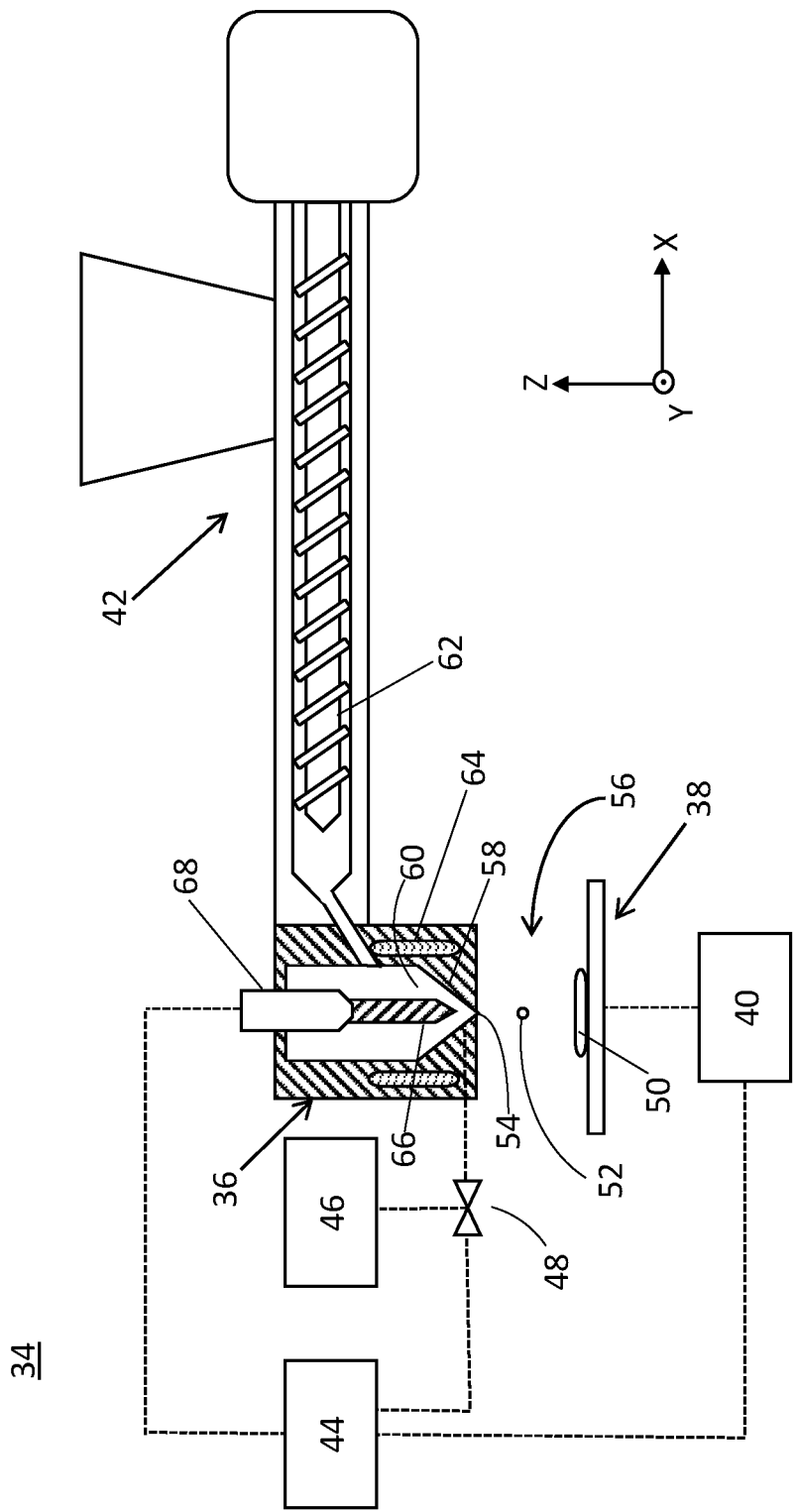
FIG. 3 shows aspects of a system for manufacturing a 3D polymer foam footwear component according to one embodiment.

One embodiment of a system 34 for manufacturing a 3D polymer foam footwear component is shown schematically in FIG. 3. The system 34 can include at least a discharge unit 36, an object carrier 38, an actuator 40 for moving the object carrier 38 relative to the discharge unit 36, a material preparation unit 42 for processing a base polymer material into a fluid or liquid phase and feeding it to the discharge unit 36, and a controller 44. The system 34 further includes at least blowing agent reservoir 46 for storing a blowing agent, which can be delivered to the discharge unit 36 through an injector valve 48. This injector valve optionally can be electronically controlled by a controller 44 that can precisely meter the amount of blowing agent that is introduced to the molten material or the droplet.

The system 34 can produce a 3D polymer foam footwear component 50, such as a midsole, outsole, or insole, from the base polymer material and the blowing agent by sequentially discharging droplets 52 through an outlet opening 54 of the discharge unit 36 into a design space 56, onto or toward the object carrier 38. The object carrier 38 is movable in one, two or three dimensions, within the design space 56 relative to the discharge unit 36. Optionally, in alternative systems, the discharge unit can move in those dimensions relative to the object carrier.

The deposition and consolidation of a plurality of droplets 52 form the 3D shape of the footwear component 50. The droplets 52 expand and cool to form foam pellets. As described in further detail below, using the various embodiments of the systems and/or methods described herein, each individual droplet 52 can have its own material properties, such as density, hardness, toughness, elasticity, stiffness, and/or durability, and physical characteristics, such as dimensions (e.g. diameter or thickness), shape, and/or color. These properties can be modified by altering the amount or type of blowing agent introduced to the droplet and/or the molten polymer.

The discharge unit 36 can include at least one primary nozzle 58 for dispensing droplets 52 and a material reservoir 60 terminating at the outlet opening 54. Material within the reservoir 60 can be supplied, continuously or intermittently, by a material supply device 62 of the material preparation unit 42, such as a screw feeder. In other embodiments, the material preparation unit 42 can have another type of material supply device 62 such as, but not limited to, a gear pump, a metering pump or a solenoid-controlled valve. In the present embodiment, the screw feeder 62 maintains the material in the material reservoir 60 under pressure. The material reservoir 60 can be equipped with a heating element 64 to maintain the polymer material in a fluent or liquid state.

A nozzle needle 66, concentrically aligned with the material reservoir 60, is driven by an actuator 68 to oscillate up and down as a nozzle closure; in one non-limiting example, the actuator 68 is a piezo actuator performing a pulsed nozzle closure. When the nozzle needle 66 oscillates downward, it expels droplets 52 of liquid material out through the outlet opening 54. When the nozzle needle 66 moves upward, the pressurized fluid supply quickly refills the reservoir 60.

While a discharge unit 36 with a single primary nozzle 58 is shown for the system 34, in another embodiment of the system, the discharge unit 36 can comprise a plurality of dispensing nozzles 58, which can each have the same or a separate supply of liquid polymer material. For example, each nozzle 58 can be supplied with a liquid polymer material having a different combination of material properties, such as density, hardness, toughness, elasticity, stiffness, and/or durability, and/or physical characteristics, such as dimensions (e.g. diameter or thickness), shape, and/or color. Along the same lines, while a single material processing unit 42 is shown for the system 34, in another embodiment the system 34 can comprise a plurality of material processing units 42.

In a further embodiment of the invention, the liquid polymer material can be discharged as discrete liquid droplets by any suitable means. Moreover, the liquid droplets can be discharged in any direction.

The discharge unit 36 can be arranged vertically within the design space 56, with the component 50 moved underneath the discharge unit 36 via the object carrier 38. The object carrier 38 can be arranged on a multi-axis geometry for translation of the object carrier 38 along three mutually orthogonal X-, Y- and Z-axes defining a conceptual Cartesian coordinate system, and can further rotate the object carrier 38 about one or more of the X-, Y- and Z-axes. Movement of the object carrier 38 within the design space 56 is completed by the actuator 40, and in one example the actuator 40 can be an articulated 6-axis robot.

One non-limiting example of a suitable actuator 40 for the object carrier 38 according any of the embodiments described herein is disclosed in U.S. Patent Application No. 2014/0197576 to Kraibuhler et al., published Jul. 17, 2014, which is incorporated herein by reference in its entirety. In another example, the actuator 40 for the object carrier 38 can have less than six degrees of freedom, including being configured to perform only translational movements. In other embodiments of the system 34, the actuator 40 can be operably coupled with the discharge unit 36 for movement relative to the object carrier 38, or both the discharge unit 36 and the object carrier 38 can have individual actuators which are moved in concert by the controller 40.

The controller 44 can be operably coupled with at least the object carrier 38 for controlling the movement of the object carrier 38 relative to the discharge unit 36. The controller 44 can generate control signals in response to the coordinates of a 3D computer-aided (CAD) design or other representation for the footwear component 50, and moves the object carrier 38 accordingly.

The controller 44 can be operably coupled with the discharge unit 36, such as with the actuator 68, and can control the discharge unit 36 during movement of the object carrier 38 to dispense droplets continuously or intermittently on demand for constructing the component 50. The controller 44 can generate control signals in response to the coordinates of the 3D computer-aided (CAD) design or other representation for the footwear component 50, and moves the nozzle needle 66 accordingly. For example, the oscillation rate of the nozzle needle 66 can be controlled to dispense droplets 52 faster or slower. In another example, the speed of the object carrier 38 and the dispensing rate of the discharge unit 36 can be controlled in concert to achieve a desired relative placement of droplets and packing density.

The controller 44 can be operably coupled with the injector valve 48 and can control the injector valve 48 to inject the blowing agent continuously or intermittently on demand for providing the blowing agent to the molten polymer material. The controller 44 can generate control signals in response to the coordinates of the 3D computer-aided (CAD) design or other representation for the footwear component 50, and opens or closes the injector valve 48 accordingly. For example, the volume of blowing agent per droplet 52 can be controlled.

It is noted that the blowing agent can be mixed in with the polymer material in liquid state at any point upstream of the outlet opening. In the embodiment shown herein, the blowing agent can be injected into the material reservoir 60 just upstream of the outlet opening 54, and can more specifically be applied just prior to formation of a liquid droplet 52. For example, the injector valve 48 can be provided at the nozzle 58 of the discharge unit 36 to inject blowing agent directly into the material reservoir 60 at a port 49P. The injection of blowing agent can be timed with the movement of the nozzle needle 66 to inject blowing agent on the upstroke of the nozzle needle 66, into the area below the nozzle needle 66. With the injection of blowing agent at the nozzle 58, the material properties of the foam pellets resulting from the droplets 52 can be tailored for each individual pellet.

Optionally, the injector valve 48 can be provided upstream of the discharge unit 36, such as at the material preparation unit 42 to feed blowing agent into the material supply device 62. Further optionally, the blowing agent can be mixed in with the granulated polymer material supplied to the material preparation unit 42. Either of these options can provide uniform material properties to the foam pellets resulting from the droplets 52, while still allowing the shape and placement of the droplets 52 to be fully controllable. Even further optionally, the port 49P can be replaced with a secondary nozzle 49S that can introduce the blowing agent into the droplet as and/or after the droplet is formed. The nozzle tip can be precisely places so the blowing agent enters or otherwise becomes associated with the forming or formed droplet 52.

While a single blowing agent reservoir 46 and injector valve 48 are shown for the system 34, the system 34 optionally can include multiple reservoirs 46 and injector valves 48, which can each supply a different blowing agent. With the injection of different blowing agents being controllable, the dimensions and material properties of the foam pellets resulting from the droplets 52 can be tailored for each individual pellets.

A method of making a footwear component will now be described with further reference to FIG. 3. The sequence of steps discussed is for illustrative purposes only and is not meant to limit the method in any way as it is understood that the steps can proceed in a different logical order, additional or intervening steps can be included, or described steps can be divided into multiple steps, without detracting from the invention.

The method can include obtaining a 3D computer-aided (CAD) design or other representation for the footwear component 50 to be manufactured. The CAD design or other representation is provided to the controller 44, which generates one or more control signals in response to the coordinates of the design.

Droplets 52 of liquid polymer material can be sequentially dispensed from the discharge unit 36 into the design space 56, and optionally onto the object carrier 38 or onto a portion of the component 50 already formed. Liquid polymer material is prepared by the material preparation unit 42, and supplied to the discharge unit 36 by the material supply device 62.

The blowing agent can be injected or introduced into the liquid polymer material prior to or sequentially with, or after the discharge of one of the droplets 52. The blowing agent can expand the liquid polymer material when or after the droplets 52 leave the primary nozzle 58. These droplets 52 can continue to expand as the droplets 52 cool and solidify into foam pellets or cells. The plurality of cooled and solidified foam pellets or cells on the object carrier 38 form the component 50.

Before, during and/or after dispensing, the object carrier 38 can be moved relative to the dispensing unit 36 under the guidance of the controller 44 along selected directions in a predetermined pattern, which can optionally follow the three dimensional contours of a sole component to be formed, such as a midsole, an outsole, an insole or a footbed. The movement of the object carrier 38 relative to the discharge unit 36, including direction, rotation, and speed, the dispensing rate of the discharge unit 36, and/or the injection of blowing agent, all can optionally be discretely controlled by the controller to form the 3D component 50. As such, foam footwear components with complex geometries, material properties, and/or colors can be produced.

Figure 4:
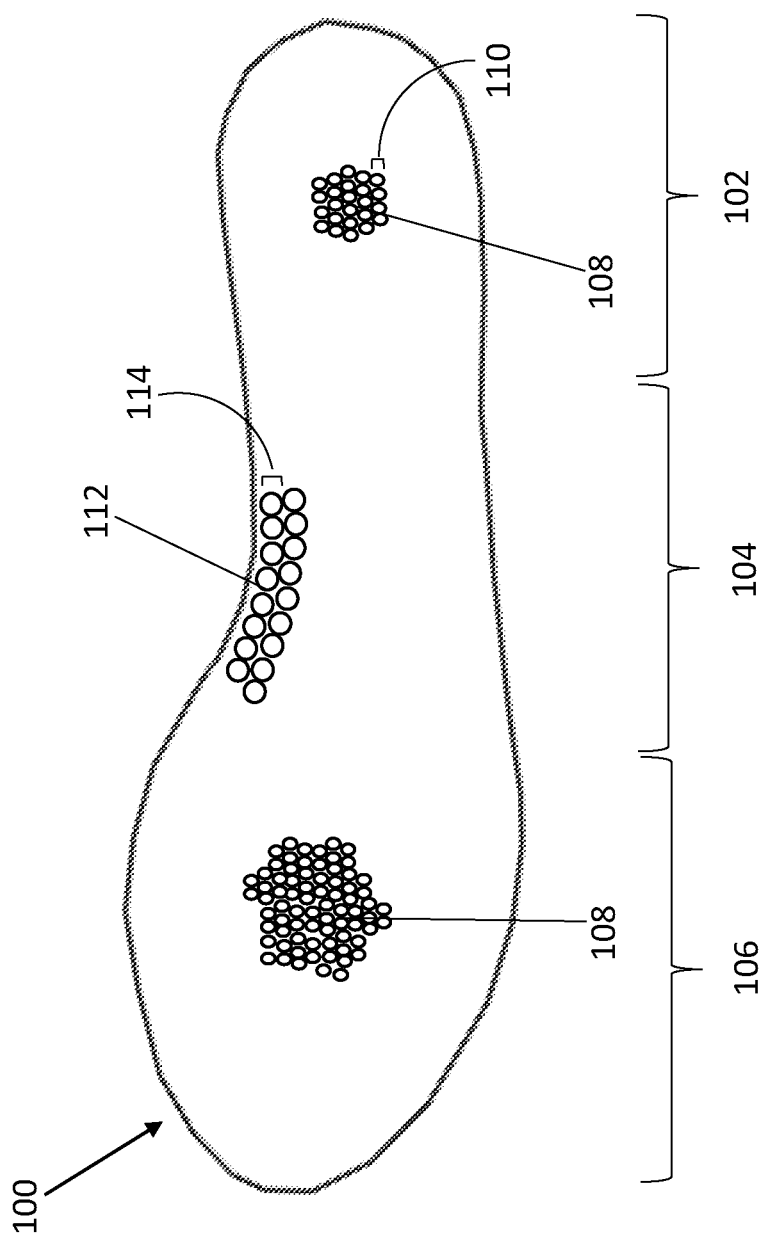
FIG. 4 is a schematic view of a first alternative embodiment of a footwear component.

A first alternative embodiment of a footwear component is shown in FIG. 4 and generally designated 100. The component can be, for example, a 3D free-formed polymer foam midsole 100 as described above with reference to FIGS. 1-2, and can be manufactured using the systems and/or methods described above. The midsole 100 can include a heel section 102, an arch or midfoot section 104 and a forefoot section 106, and can be formed of a plurality of foam pellets formed by the expansion and cooling of droplets of liquid polymer material injected with a blowing agent, as described above with reference to FIG. 3. In the present embodiment, the size of the pellets can vary across the midsole 100. For example, the midsole 100 can include at least one region of pellets 108 having a first diameter 110 and at least one region of pellets 112 having a second diameter 112 which is greater than the first diameter 110. By controlling the size of each droplet, i.e. by pulsing the needle 66 faster or slower, the material volume per droplet can be varied, which results in different sizes or diameters for the resulting foam pellets. Pellets of different size or diameter can be placed in discrete zones of the final midsole 100. For example, the midsole 100 can have a firmer heel and/or forefoot section 102, 106 by deposing smaller droplets forming smaller pellets 108 in this area and a softer arch section 104 by deposing larger droplets forming larger pellets 112 in this area.

Figure 5:
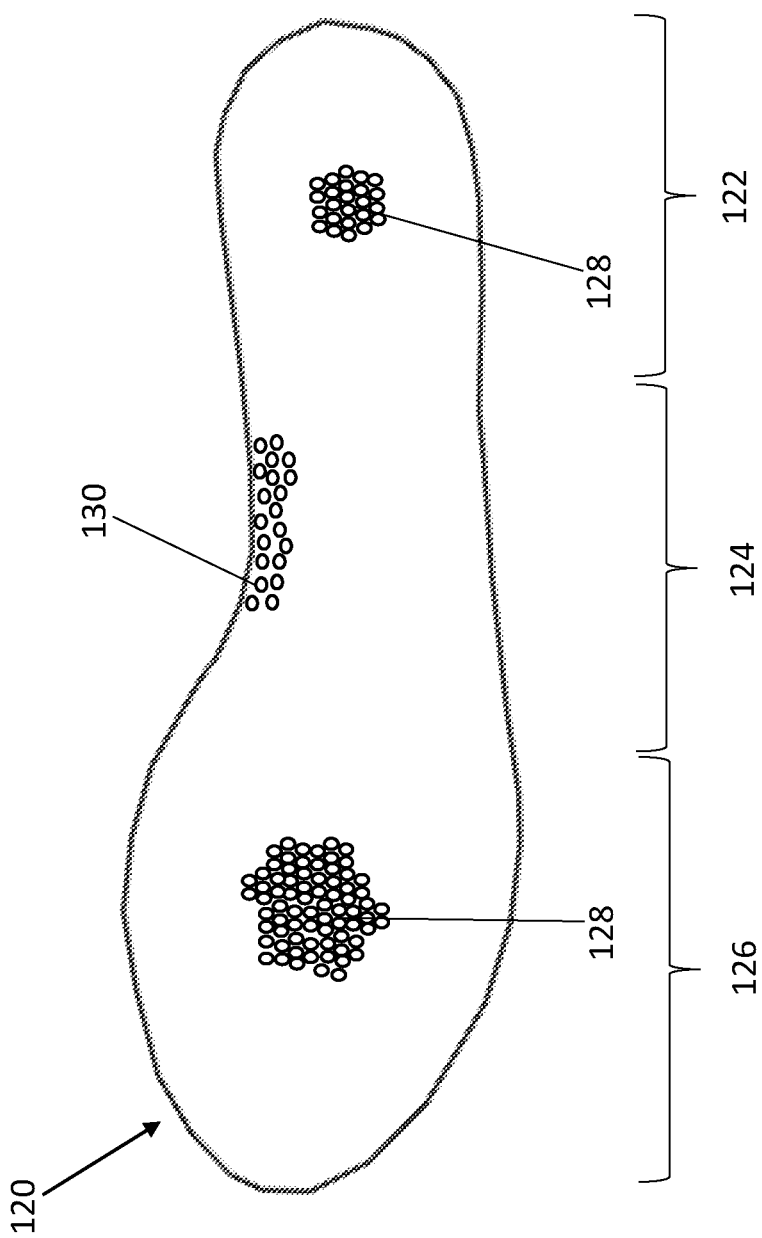
FIG. 5 is a schematic view of a second alternative embodiment of a footwear component.

A second alternative embodiment of a footwear component is shown in FIG. 5 and generally designated 120. The component can be, for example, a 3D free-formed polymer foam midsole 120 as described above with reference to FIGS. 1-2, and can be manufactured using the systems and/or methods described above. The midsole 120 can include a heel section 122, an arch or midfoot section 124 and a forefoot section 126, and can be formed of a plurality of foam pellets formed by the expansion and cooling of droplets of liquid polymer material injected with a blowing agent, as described above with reference to FIG. 3. In the present embodiment, the packing density of the pellets can vary across the midsole 120. For example, the midsole 120 can include at least one region of pellets 128 having a first packing density and at least one region of pellets 130 having a second packing density, which is greater than the first packing density. By controlling the movement of the object carrier 38 and/or the dispensing rate of the discharge unit 36, i.e. by moving the object carrier 38 faster or slower and/or by pulsing the needle 66 faster or slower, the distance between droplets can be varied, which results in different packing density for the resulting foam pellets. Areas of different packing densities can be placed in discrete zones of the final midsole 120. For example, the midsole 120 can have a softer arch section 124 with a lower packing density by deposing droplets forming the pellets 128 in this area farther apart and a firmer heel and/or forefoot section 122, 126 with a higher packing density by deposing droplets forming the pellets 130 in this area closer together.

Figure 6:
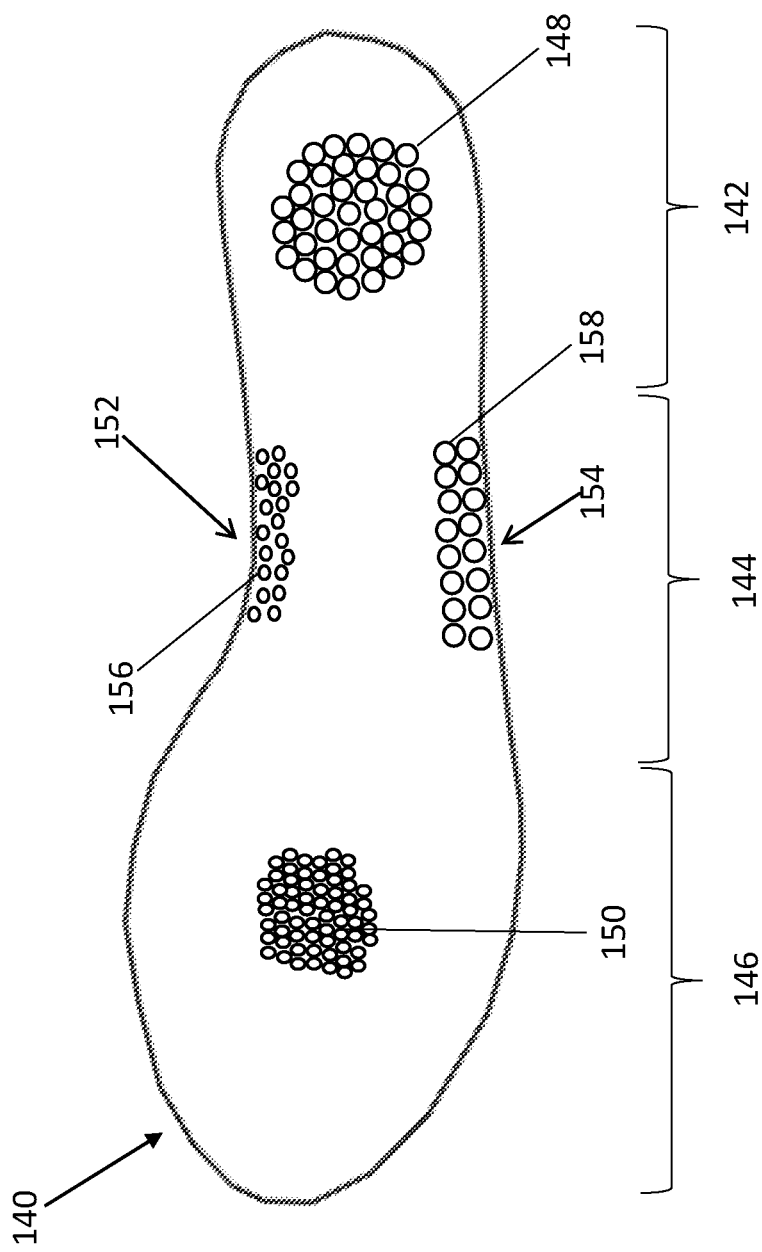
FIG. 6 is a schematic view of a third alternative embodiment of a footwear component.

A third alternative embodiment of a footwear component is shown in FIG. 6 and generally designated 140. The component can be, for example, a 3D free-formed polymer foam midsole 140 as described above with reference to FIGS. 1-2, and can be manufactured using the systems and/or methods described above. The midsole 140 can include a heel section 142, an arch or midfoot section 144 and a forefoot section 146, and can be formed of a plurality of foam pellets formed by the expansion and cooling of droplets of liquid polymer material injected with a blowing agent, as described above with reference to FIG. 3. In the present embodiment, the midsole 140 can include pellets of different densities. For example, the midsole 140 can include at least one region of pellets 148 having a first density and at least one region of pellets 150 having a second density, which is greater than the first density. The pellets 148, 150 can further have the same or different sizes, i.e. diameters. As shown herein, the lower density pellets are larger and the higher density pellets are smaller. By metering the amount of blowing agent injected into each droplet, i.e. by timing the opening of the injector valve 48, the volume of blowing agent per droplet can be varied, which results in different densities for the resulting foam pellets. Pellets of different density can be placed in discrete zones of the final midsole 140. For example, the midsole 140 can have a softer heel section 142 by deposing lower density droplets forming the pellets 148 in this area and a firmer forefoot section 146 by deposing higher density droplets forming the pellets 150 in this area. Still further, the arch section 144 of midsole 140 can have a firmer medial arch region 152, such as by deposing higher density droplets forming pellets 156 in in this area, and a softer lateral arch region 154, such as by deposing lower density droplets forming the pellets 158 in this area.

Figure 7:
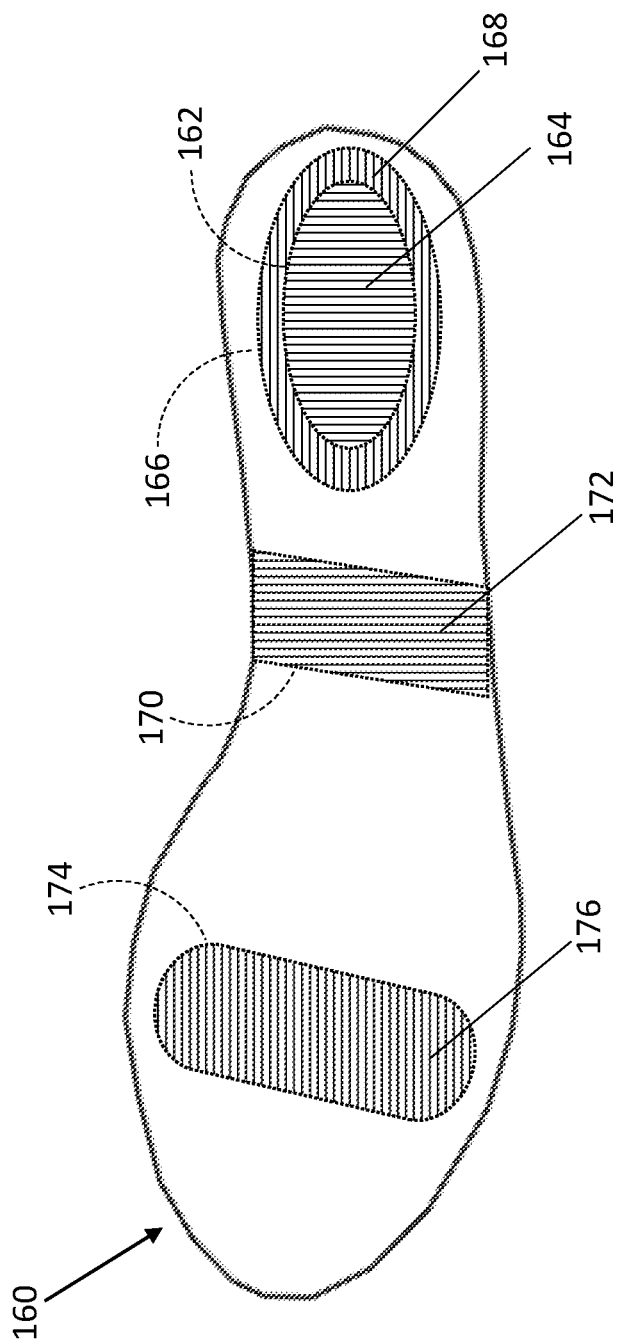
FIG. 7 is a schematic view of a fourth alternative embodiment of a footwear component.

A fourth alternative embodiment of a footwear component is shown in FIG. 7 and generally designated 160. The component can be, for example, a 3D free-formed polymer foam midsole 160 as described above with reference to FIGS. 1-2, and can be manufactured using the systems and/or methods described above. The midsole 160 can be formed of a plurality of foam pellets formed by the expansion and cooling of droplets of liquid polymer material injected with a blowing agent, as described above with reference to FIG. 3. In the present embodiment, the midsole 160 can comprise a multi-material and/or multi-color midsole 160. For example, the midsole 160 can include at least one region of pellets 162 formed by a first material 164 and at least one region of pellets 166 formed by a second material 168 which has one or more material properties that is/are different than that of the first material 164, including one or more different mechanical and/or physical properties. For example, the first and second materials 164, 168 can have different hardness, toughness, elasticity, stiffness, durability, and/or density. In another example, the midsole 160 can include at least one region of pellets 170 having first color 172 and at least one region of pellets 174 having a second color 176 that is different than the first color 172.

Figure 8:
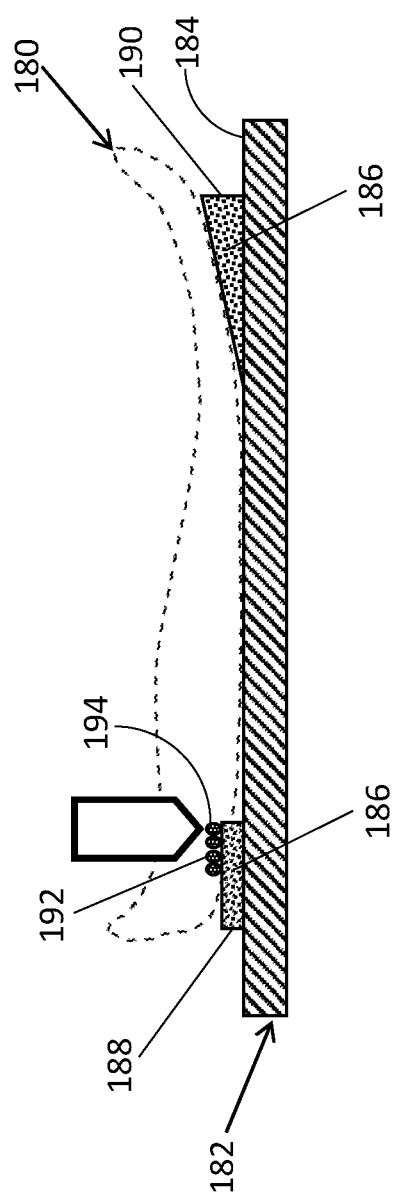
FIG. 8 is a schematic view of a fifth alternative embodiment of a footwear component and an object carrier.

A fifth alternative embodiment of a footwear component and object carrier is shown in FIG. 8 and generally designated 180 and 182, respectively. The component can be, for example, a 3D free-formed polymer foam midsole 180 as described above with reference to FIGS. 1-2, and be manufactured using the systems and/or methods described above and the object carrier 182 shown. The midsole 180 can be formed of a plurality of foam pellets formed by the expansion and cooling of droplets of liquid polymer material injected with a blowing agent, as described above with reference to FIG. 3. The object carrier 182 illustrated includes a flat surface 184, and a first material 186 is laid down droplet-by-droplet on the flat surface 184 to form one or both of a heel pad 188 and a toe spring 190 on which the midsole 180 is built. Next, a second material 192 is laid down one droplet 194 at a time to form the midsole 180, using the heel pad 188 and/or the toe spring 190 to support and shape the midsole 180 during manufacture. The completed midsole 180 is thereafter separated from the heel pad 188 and toe spring 190. This method can likewise be used to adapt a flat-surface or otherwise featureless object carrier 182 to support and shape other components of footwear during manufacture.

Figure 9:
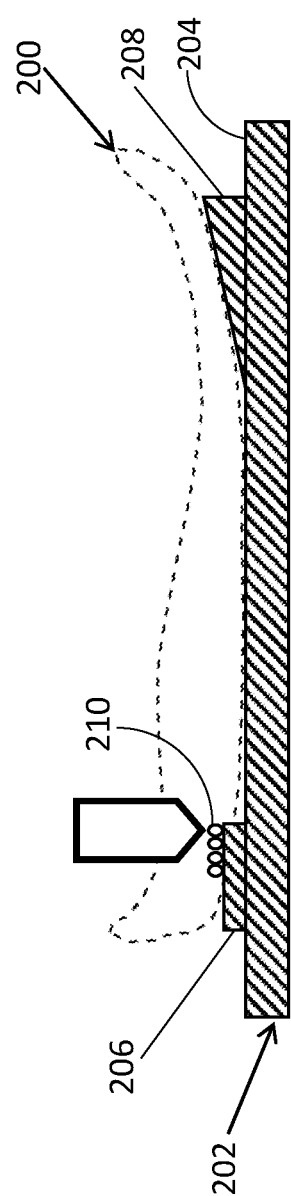
FIG. 9 is a schematic view of a sixth alternative embodiment of a footwear component and an object carrier.

A sixth alternative embodiment of a footwear component and object carrier is shown in FIG. 9 and generally designated 200 and 202, respectively. The component can be, for example, a 3D free-formed polymer foam midsole 200 as described above with reference to FIGS. 1-2, and can be manufactured using the systems and/or methods described above and the object carrier 202 shown. The midsole 200 can be formed of a plurality of foam pellets formed by the expansion and cooling of droplets of liquid polymer material injected with a blowing agent, as described above with reference to FIG. 3. The object carrier 202 illustrated includes a non-flat or featured surface 204 on which the midsole 200 is built. For example, the object carrier 202 includes one or both of a heel pad 206 and a toe spring 208 that is integral with or otherwise provided on the upper surface of the object carrier 202, i.e. the surface that confronts the discharge unit. A liquid polymer material is laid down one droplet 210 at a time to form the midsole 200, using the heel pad 206 and/or the toe spring 208 to support and shape the midsole 200 during manufacture. Other non-flat or featured object carriers can likewise be provided to support and shape other components of footwear during manufacture.

Figure 10:
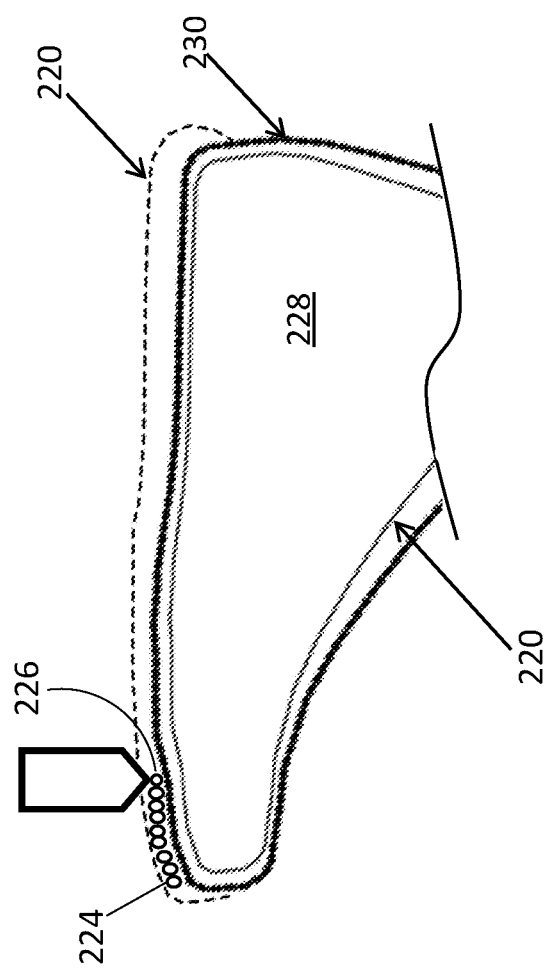
FIG. 10 is a schematic view of a seventh alternative embodiment of a footwear component and an object carrier.

A seventh alternative embodiment of a footwear component and object carrier is shown in FIG. 10 and generally designated 220 and 222, respectively. The component can be, for example, a 3D free-formed polymer foam midsole 220 as described above with reference to FIGS. 1-2, and can be manufactured using the systems and/or methods described above and the object carrier 222 shown. The midsole 220 can be formed of a plurality of foam pellets 224 formed by the expansion and cooling of droplets 226 of liquid polymer material injected with a blowing agent, as described above with reference to FIG. 3. The object carrier 222 illustrated comprises a last 228 on which a footwear upper 230 is supported. Droplets 226 of liquid polymer material injected with a blowing agent are dispensed one at a time to form the midsole 220 directly on the upper 230, attaching to the upper 230 as the droplets 226 expand and cool to solidify into foam pellets 224. The pellets 224 can attach to the upper 230 via mechanical or chemical bonding, or a combination of both. In one example, the droplets 226 can enclose the fibers or other material of the upper 230 to mechanically bond to the upper 230 as the droplets 226 solidify into pellets 224. In another example, the droplets 226 can melt the fibers or other material of the upper 230 to chemically bond to the upper 230 as the droplets 226 solidify into pellets 224. In one specific example, the upper 230 can comprise a coextruded yarn (such as fusible yarn) having at least one strand in the yarn with a lower melt temperature than other yarns, or a monofilament having an outer layer that has a lower melt temperature than a core fiber. When the relatively warm droplets 226 engage the lower melt temperature strands or outer layer, those components melt on contact to chemically bond the droplets to the upper 230. As more droplets bond atop lower levels of droplets, all levels are eventually bonded to such yarns or monofilament. In turn, the sole component or other component is well-secured to the upper.

With any of the embodiments of the 3D footwear component disclosed herein, the foam droplets can be laid down into standard shapes and shoe-sizing, or could be laid down in shapes customized for different activities or foot shapes. Furthermore, to the extent not already described, the different features and structures of the various embodiments shown in FIGS. 4-10 can be used in combination with each other as desired, or can be used separately. The various features of the different embodiments can be mixed and matched in various configurations as desired to form new embodiments, whether or not the new embodiments are expressly described.

The embodiments herein can be used to produce 3D polymer foam footwear components with complex geometry and/or complex variations in material properties and color, which are otherwise not possible with traditional manufacturing processes such as die cutting or stamping. With this, a 3D polymer foam footwear component with a desired combination of geometry, material properties, and/or color can be rapidly produced.

The embodiments also can be utilized during a design or prototyping phase of footwear manufacture, for small batch volumes, or can be scaled up for commercial manufacture. Still further, the system and/or method can further be utilized to create footwear customized for an individual wearer.

It is understood that the elements shown in the drawings are not necessarily drawn to scale, unless otherwise noted. Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention can be replaced by alternative elements that provide substantially similar functionality or otherwise provide adequate operation. This includes, for example, presently known alternative elements, such as those that might be currently known to one skilled in the art, and alternative elements that can be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of manufacturing a polymer foam component for an article of footwear comprising:
   sequentially dispensing droplets of a liquid polymer material from a discharge unit into a design space at least partially defined by an object carrier configured to support a polymer foam component for an article of footwear during construction;
   introducing a blowing agent to the liquid polymer material at least one of before and, during and after the sequentially dispensing step;
   generating control signals in response to coordinates of a 3D design for the polymer foam component; and
   moving the at least one of the object carrier and the discharge unit relative to the other in response to the control signals;
   wherein the polymer foam component comprises a plurality of foam pellets formed by the expansion and cooling of the droplets in the design space,
   wherein the discharge unit comprises a material reservoir terminating at an outlet opening, and
   wherein the sequentially dispensing step comprises oscillating a nozzle needle within the material reservoir relative to the outlet opening.

2. The method of claim 1 comprising:
   oscillating the nozzle needle within the material reservoir relative to the outlet opening in response to the control signals.

3. The method of claim 2,
   wherein the introducing the blowing agent comprises injecting blowing agent into the material reservoir beneath the nozzle needle.

4. The method of claim 1,
   wherein the introducing the blowing agent comprises injecting blowing agent into the material reservoir.

5. The method of claim 4 comprising:
   controlling the dispensing rate of droplets from the discharge unit in response to the control signals.

6. The method of claim 5 comprising:
   controlling the injection of blowing agent in response to the control signals.

7. A method of manufacturing a polymer foam component for an article of footwear comprising:
   sequentially dispensing droplets of a liquid polymer material from a discharge unit into a design space at least partially defined by an object carrier;
   expanding the droplets of liquid polymer material by introducing therein a blowing agent;
   allowing the droplets of liquid polymer material to cure and produce a plurality of foam pellets that form at least one of a midsole, an outsole and an insole of an article of footwear; and
   cooling the droplets of liquid polymer material injected with the blowing agent.

8. The method of claim 7,
   wherein the blowing agent comprises at least one of a chemical blowing agent and a physical blowing agent.

9. A method of manufacturing a polymer foam component for an article of footwear comprising:
   sequentially dispensing droplets of a liquid polymer material from a discharge unit into a design space at least partially defined by an object carrier;
   expanding the droplets of liquid polymer material by introducing therein a blowing agent;
   allowing the droplets of liquid polymer material to cure and produce a plurality of foam pellets that form at least one of a midsole, an outsole and an insole of an article of footwear; and
   varying at least one of a size and a shape of the plurality of foam pellets.

10. The method of claim 9 comprising:
    introducing the blowing agent in at least one of the liquid polymer material and the droplets via at least one of a port and a secondary nozzle adjacent a primary nozzle before the droplets are deposited in place within the design space.

* * * * *